July 26, 1960

J. MEIJER DREES 2,946,191

RAMJET FOR A ROTATING MEMBER SUCH AS
A ROTOR OR PROPELLER OF AN AIRCRAFT

Filed March 29, 1955

INVENTOR
Jan Meijer Drees
By Watson, Cole, Grindle + Watson
ATTORNEYS

United States Patent Office 2,946,191
Patented July 26, 1960

2,946,191

RAMJET FOR A ROTATING MEMBER SUCH AS A ROTOR OR PROPELLER OF AN AIRCRAFT

Jan Meijer Drees, Rotterdam, Netherlands, assignor to Nederlands Instituut voor Vliegtuigontwikkeling, Delft, Netherlands Filed Mar. 29, 1955, Ser. No. 497,768

Claims priority, application Netherlands Apr. 12, 1954

6 Claims. (Cl. 60—39.35)

This invention relates to a ramjet (athodyd or propulsive duct) for a rotating member such as a rotor or propeller of an aircraft.

It is known to use ramjets for driving the rotor of a helicopter, the ramjets being arranged at or near the tips of the rotor blades. Arrangements of that type are described in "Aviation Week," September 10, 1951, page 32, "Aeronautical Engineering Review," October 1953, page 48 and U.S. Patent 2,625,788 to Neikirk and Izo dated January 20, 1953.

A ramjet substantially comprises a tube, adapted to move longitudinally with a great speed $v$ relative to the ambient air and having a device for heating the air flowing through the tube, whereby the air or exhaust gas leaving the tube rearwardly will have a greater velocity $v2$ than the air entering in front with a velocity $v1$. Apart from friction losses as a result of the air flow along the wall, a resultant force $F=m(v2-v)$ is active upon the tube, $m$ being the mass per unit of time flowing through the tube.

Provided the heat input and the initial velocity are sufficient, the force $F$ will be great enough to sustain or even accelerate the movement.

Practically there is a notable compression even ahead of the intake, so that the velocity $v1$ of the entering air relative to the ramjet is always considerably smaller than the velocity $v$ of the tube relative to the uninfluenced ambient air. In the tube itself the entered air undergoes a further increase of pressure, i.e. a further acceleration with respect to the ambient air, or putting it in another way, a retardation relative to the ramjet. A result of this is that centrifugal accelerations are effective upon the air and the gasses in the tube, amounting to 70–80% of the centrifugal acceleration acting upon the tube itself, which may be in the order of $1000.g$ in the case of a ramjet at the tip of a helicopter rotor blade ($g$=acceleration of gravity).

Since the inlet air also has to serve as an oxidant and the relative velocity of this air with respect to the propulsive duct considerably exceeds the velocity of flame propagation, a flame holder or combustion stabilizing baffle must be arranged in the tube, a turbulent wake with minor relative velocities developing behind the flameholder. The flame front is approximately a frustro-conical surface originating from the edge of the flame holder and opening funnel-shaped toward the outlet. The angle between an element of the flame front and the local air velocity is defined by the ratio of the rate of flame propagation and the air velocity. To prevent the escape of unused air the combustion chamber must be designed so long, that the flame front reaches the wall in the whole circumference, and in order to limit the length of the tube, the flame holder is usually provided with circumferential lips which may be curved in the direction of flow.

Prior ramjets for helicopter rotors had the disadvantage that the effect of centrifugal force acting upon the air, combustible and exhaust gases present in the tube is not or insufficiently taken into account, and that the cross-section of the duct has not the most favorable shape for minimum weight, if the centrifugal force is properly taken into account.

It is an object of the present invention to remedy these disadvantages.

According to the invention a ramjet for a rotatable member such as a rotor or propeller is characterized by centrifugal-asymmetry.

For the purpose of this specification the "centrifugal-asymmetry" of a ramjet engine comprising a propulsive duct and a flame holder therein for securing to the outboard end of a member rotating about an axis outside said duct is defined as a relationship between the flame holder and the duct so that the flame holder leaves a greater part of the cross-section of the duct free for the passage of air in the inboard half than in the outboard half of the duct.

The centrifugal-asymmetry may be realized in the duct of the ramjet and/or in the means constructed therein.

The flame gases in the wake behind the flame holder have a high temperature and a lower specific weight than the cold air streaming past the flame holder. The centrifugal forces active on the particles of the cold air will therefore be stronger than the centrifugal forces active on the particles of the flame, and this difference will cause the cold air to displace the flame towards the axis of rotation.

Hereby a portion of the wall where the flame strikes the same may be overheated and a part of the inlet air may reach the outlet unused. These drawbacks are met by the centrifugal-asymmetry according to the invention.

Further objects and features will become apparent in the following description of a few embodiments shown diagrammatically in the drawings, in which.

Figure 1:
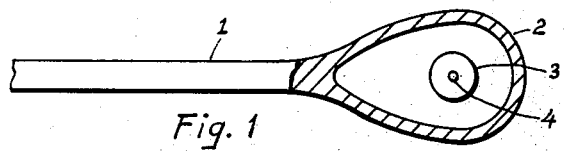
Fig. 1 represents in cross section a ramjet formed at the tip of a rotor blade and having an egg-shaped cross section.

Referring to Fig. 1, there is shown in a purely diagrammatical way a rotor blade 1. At the tip of this blade 1 is mounted a ramjet, the duct or combusion chamber 2 thereof having an egg-shaped cross section. The vertex of the egg-shaped cross section is pointing towards the rotor axis. The distance between the flame holder 3 and the fuel atomizer 4 on the one hand and the wall of the duct on the other hand is greater at the side of the axis of rotation than at the opposing side. The axis of rotation is not shown in Fig. 1 and should be imagined in the plane of the drawing to the left outside the figure.

The egg-shape according to Fig. 1 is favorable in regard to mechanical strength against centrifugal forces, allowing a light weight design, and moreover the egg-form presents an enlarged room for the flame to bend towards the axis of rotation, as compared with a combustion chamber with a circular cross section and a centrally disposed flame holder and atomizer therein.

Figure 2:
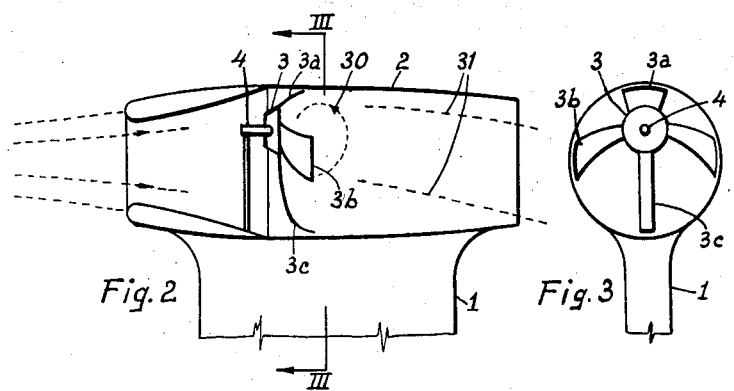
Fig. 2 shows another form of a ramjet for a rotor blade in longitudinal section and having a centrifugal-asymmetric flame holder.

Fig. 2 is a longitudinal section of a ramjet taken in the direction of the rotor blade 1 and perpendicular to the axis of rotation, which is to be imagined below Fig. 2 perpendicular to the plane of the drawing. The cross section of the tube or combustion chamber 2 has a circular shape and is shown in Fig. 3.

Figure 3:
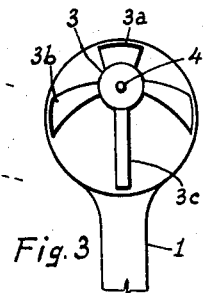
Fig. 3 is a cross section of the device according to Fig. 2 along the line III—III seen in the direction of the arrows.

In the ramjet of Figs. 2 and 3 the centrifugal-asymmetry is realized by the eccentric disposition of the atomizer 4 and the flame holder 3 and by the asymmetric shape of the star formed by the lips 3a, 3b, 3c.

By these measures a one-sided vortex 30 will develop, which will be maintained substantially by an air flow passing the flame holder at the side of the axis of rotation, contrary to the toroidal vortex that would appear in the case of a symmetrical and symmetrically disposed flame holder.

The fuel is atomized in the vortex behind the flame holder and a small part of the fuel is burnt here. The major part of the fuel is mixed with additional air and burnt in the wake area next to the vortex just mentioned. Air and gas velocities are small in the area close behind the flame holder and gradually grow to greater magnitude in greater distances from the flame holder in the wake area. The said wake area is bounded by the dotted lines 31 in Fig. 2, approximately.

Because of vigorous turbulence the boundaries of the mixing area and the flame front cannot be defined exactly.

Experiments have shown that for the development of a favorable vortex form only little air should pass the flame holder by the side remote from the axis of rotation. For that reason it is preferred, according to the invention, to make the lips of the star emanating from the flame holder narrower as they are disposed nearer the axis of rotation. This principle is shown diagrammatically in Fig. 3 with a star comprising four lips. In practice better results may be obtained with a greater number such as eight lips.

Referring again to the ramjet represented in Figs. 2 and 3 it is remarked, that the fuel must be at least partly vaporized in the turbulence area behind the flame holder and be mixed with air, before this fuel could ignite. However, combustion may also be separated from the atomizing and mixing functions by disposing the atomizer ahead of the flame holder.

In ramjets for rotors and propellers the path of the liquid fuel after leaving the atomizers greatly affects the mixing and the flame development.

The droplets emanating from the atomizer, moving freely, tend to proceed in a straight path. However, the ramjet following a strongly curved orbit, the droplets will not make rectilinear paths with respect to the ramjet duct. Should the atomizer or atomizers be placed so that the fuel distribution is effected with the best possible regularity if the motor is stationary or moving in a straight line, then a very irregular asymmetric distribution must occur if the motor describes a curved path and the atomizer disposition is the same.

Furthermore it matters whether the fuel is injected in the engine upstream or downstream of the flame holder. The fuel atomized behind the flame holder enters the wake of the flame holder directly in the area where the air velocity is relatively small. Air friction soon consumes the velocity of the droplets in this area and thus the influence of the orbit curvature of the motion of the ramjet upon the path of the droplets is very important. Should the fuel be injected upstream of the flame holder, then the droplets will be dragged with the fast flowing inlet air, and the paths of the droplets will be less affected by the orbit of the motor. In the latter case a less irregular distribution of the mixture will be experienced than with atomizing of the fuel solely behind the flame holder.

In order to obtain a good distribution of the mixture and the flame in the case of a rotating rotor, an atomizer disposed in front of the flame holder may, according to the invention, be arranged asymmetrically in the tube and, more specifically, be placed nearer the axis of rotation than the geometrical center of gravity of the local cross-section.

When using fuels of poor volatility it appears that the extinguishing limits (i.e. the air velocities making the flame to be blown out) with a rich and a poor mixture are very close to each other, which is a drawback if atomizing is only performed before the flame holder.

This can be remedied according to the invention by the application of atomization both before and after the flame holder, the foremost atomizing means being nearer the axis of rotation than the hindmost atomizing means. In this way the benefit of centrifugal asymmetry according to the invention may at least partially be obtained even with a symmetrical tube and flame holder, by a centrifugal asymmetric disposition of the atomizers.

It will be observed that either one or a plurality of atomizers may be arranged before the flame holder and either one or a plurality of atomizers may be arranged behind said flame holder.

The object of the invention may also be pursued by an oblique direction of the atomizer or atomizers with regard to the axis of the ramjet.

Furthermore it is possible to prevent an unbalanced fuel distribution by the application of a plurality of atomizers having different outputs in different directions.

However, a drawback of fuel injection before the flame holder is the fact that a considerable quantity of fuel is caught by the flame holder. This fuel, deposited upon the flame holder as a liquid film, will flow over the surface of the flame holder away from the axis of rotation through the agency of the strong centrifugal force, and the result of it is that a considerable portion of the fuel may be guided to the wall of the duct remote from the axis of rotation, where it is lost for its proper purpose.

For that reason it is a further object of the invention to provide a flame holder in which the centrifugal asymmetry is also realized in such a construction of the closed central part and the lips of the flame holder, that the fuel deposited thereupon only can flow in short distances over the surface thereof. According to the invention this may be achieved in various ways, e.g. by providing the flame holder with notches or uneven spots, indentations etc. or by making the lips stepped or twisted. By these measures the fuel is compelled to quit the flame holder in adequate spots, the fuel then being carried off to the combustion area by the air flow.

Figure 4:
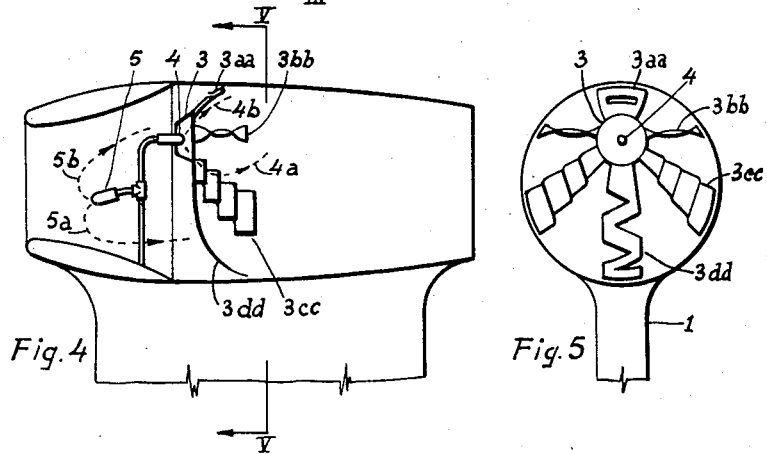
Fig. 4 is a longitudinal section of still another embodiment of a rotor blade ramjet having two fuel atomizers.
Figure 5:
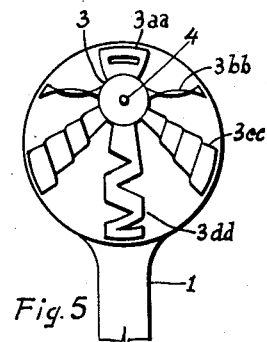
Fig. 5 is a cross section along the line V—V in Fig. 4 looking in the direction of the arrows.

Figs. 4 and 5 show in a diagrammatic way a ramjet motor having a first atomizing nozzle 4 behind the flame holder 3 and a second atomizing nozzle 5 before this flame holder. The hindmost nozzle 4 is directed backwards, whereas the foremost nozzle 5 ejects forward, opposite the direction of flow of the inlet air. The foremost atomizer 5 is arranged nearer the axis of rotation than the hindmost atomizer 4. The relative paths of a few droplets are shown in Fig. 4 with references 4a, 4b, 5a, 5b.

Fig. 5 represents in elevation the flame holder of the ramjet according to Fig. 4. This flame holder 3 comprises six lips 3aa, 3bb, 3cc, 3dd. The lip 3dd has notches and the lips 3cc are so stepped that adhering liquid will soon reach one of the steps and be hurled off by the action of centrifugal force. The flow of fuel towards the central part 3 of the flame holder will thereby almost be prevented.

The notches of the lip 3dd produces a zigzag shape. Likewise by these notches the flow of liquid over the surface towards the middle part 3 is impeded and the adhering fuel will be released at the edges of the said notches.

The lips 3bb have a twisted shape to favour the dropping in the preferred place.

The lip 3aa will gather only little fuel on account of the eccentric position of the nozzle 5. The rejection of adhering fuel may be aided by one or more slits in the lip 3aa, said slit or slits having offset edges.

In the design of a ramjet according to Figs. 4 and 5 the number of atomizers, the location and the direction of ejection thereof, and the number of lips of the flame holder may be varied as desired. The different forms of the lips in Figs. 4 and 5 are given by way of examples only and may be modified and combined in various ways. For best results the outputs of the atomizers 4 and 5 (Fig. 4) must be made different, and it has been found that preferably the output of the foremost atomizer 5 should be approximately twice the output of the hindmost atomizer 4.

The invention having been explained by description of a few embodiments and simplified showing of the drawings, it will be apparent to those skilled in the art, that centrifugal asymmetry in ramjets for rotors or propellers for aircraft may be realized in various ways without restricting the scope of the invention within the limits of the appended claims.

I claim:

1. Ramjet for securing to an outboard end of a rotary member such as an aircraft impeller rotating about an axis of rotation, comprising a propulsive duct rotating about said axis outside said duct, having a leading air intake opening and a trailing outlet opening, fuel injection means in said duct and a flame holder in said duct, said flame holder leaving a greater part of the cross-section of said duct free for the passage of air in the inboard half than in the outboard half of said duct.

2. Ramjet for a rotary member comprising a propulsive duct rotating about an axis outside itself, having a leading air intake opening and a trailing outlet opening, fuel injection means and a flame holder in said duct, the cross-section of said duct being asymmetrically egg-shaped with the vertex pointing towards said axis of rotation, said flame holder leaving a greater part of said cross-section free for the passage of air in the inboard half than in the outboard half of said cross-section.

3. Ramjet for a rotary member comprising a propulsive duct rotating about an axis outside said duct, having a leading air intake opening and a trailing outlet opening, fuel injection means and a flame holder in said duct, said flame holder having a closed central part, the centroid of said closed central part being farther from said axis of rotation than the centroid of the cross-section of said duct, said flame holder leaving a greater part of the cross-section of said duct free for the passage of air in the inboard half than in the outboard half of said duct.

4. Ramjet for a rotary member comprising a propulsive duct rotating about an axis outside itself, having a leading air intake opening and a trailing outlet opening, fuel injection means and a flame holder in said duct, said duct having a closed central part and a plurality of lips of different forms and sizes emanating star-like from said closed central part, said flame holder leaving a greater part of the cross-section of said duct free for the passage of air in the inboard half than in the outboard half of said duct.

5. Ramjet for a rotary member comprising a propulsive duct rotating about an axis outside said duct, having a leading air intake opening and a trailing outlet opening, fuel injection means and a flame holder in said duct, said flame holder having a closed central part and a plurality of lips of different forms and sizes emanating from said closed central part, the openings between said lips being greater in the inboard half than in the outboard half of said duct.

6. Ramjet for securing to an outboard end of a rotary member such as an aircraft impeller rotating about an axis of rotation, comprising a propulsive duct rotating about said axis outside itself, having a leading air intake opening and a trailing outlet opening, fuel injection means and a flame holder in said duct, said flame holder having a closed central part and a plurality of lips of different forms and sizes emanating star-like from said central part, said lips being narrower and the openings between said lips being wider at the inboard side than at the outboard side of said flame holder and the centroid of said flame holder being farther from said axis of rotation than the centroid of the cross-section of said duct, leaving a greater part of said cross-section free for the passage of air in the inboard half than in the outboard half of said duct.

References Cited in the file of this patent

UNITED STATES PATENTS

| | | |
|---|---|---|
| 2,520,388 | Earl | Aug. 29, 1950 |
| 2,582,893 | Teague | Jan. 15, 1952 |
| 2,607,191 | Lee | Aug. 19, 1952 |
| 2,625,788 | Neikirk et al. | Jan. 20, 1953 |
| 2,651,178 | Williams et al. | Sept. 8, 1953 |
| 2,689,614 | Spalding | Sept. 21, 1954 |
| 2,703,624 | Shapiro et al. | Mar. 8, 1955 |
| 2,705,401 | Allen et al. | Apr. 5, 1955 |
| 2,775,867 | Collins | Jan. 1, 1957 |

FOREIGN PATENTS

| | | |
|---|---|---|
| 995,748 | France | July 22, 1951 |
| 614,622 | Great Britain | Dec. 17, 1948 |